United States Patent [19]

Niesyn

[11] Patent Number: 4,761,138

[45] Date of Patent: Aug. 2, 1988

[54] PLANET MODEL WITH SOLAR DISPLAY

[76] Inventor: Joseph Z. Niesyn, 1820 Ardmore Ave. #48, Hermosa Beach, Calif. 90254

[21] Appl. No.: 948,101

[22] Filed: Dec. 31, 1986

[51] Int. Cl.⁴ .............................................. G09B 27/08
[52] U.S. Cl. ...................................... 434/143; 434/136
[58] Field of Search .................. 434/136, 143; 368/23, 368/24

[56] References Cited

U.S. PATENT DOCUMENTS

| | | | |
|---|---|---|---|
| 1,959,601 | 5/1934 | Schulse | 434/143 X |
| 2,490,185 | 12/1949 | Work | 434/143 |
| 2,680,308 | 6/1954 | Miltenberger | 434/143 |
| 3,014,287 | 12/1961 | Ernst | 434/143 |
| 3,197,893 | 8/1965 | Mariotti | 434/143 |
| 3,305,946 | 2/1967 | Gardin | 434/143 |
| 3,370,415 | 2/1968 | McIlvaine | 368/24 |
| 3,527,046 | 9/1970 | Pawl | 434/143 X |
| 4,102,121 | 7/1978 | Veazey | 368/24 |
| 4,666,310 | 5/1987 | Snapka | 434/143 X |

*Primary Examiner*—William H. Grieb

[57] ABSTRACT

A light source within a transparent hollow globe continually illuminates one half the globe to represent solar illumination. The light source is rotated about the north-south axis of the globe at the rate of one revolution per day and is concurrently oscillated about a second axis at the rate of one oscillation per orbit about the sun.

11 Claims, 6 Drawing Sheets

PLANET MODEL WITH SOLAR DISPLAY

BACKGROUND OF THE INVENTION

1. Field of the Invention

This invention relates in general to world globe display devices and has particular reference to a device incorporating a globe representing a planet, such as the earth, in which areas of the globe are illuminated to continually represent those areas of the planet which are currently in daylight and to also indicate the solar time at all locations on the planet.

2. Description of the Prior Art

As is well known, the earth spins about its north-south axis at the rate of one revolution per 24 hours and, at the same time, it orbits about the sun at the rate of substantially one orbit per 365 days. Since the earth's spin axis is inclined at substantially 23½ degrees to a line perpendicular to the plane of its orbital path, it is difficult to determine or visualize at any particular time the area of the earth's surface which is currently in daylight, i.e., illuminated by the sun. The same is true for other planets. Such information, however, is of interest to students of astronomy, navigation and geography, and may also be of interest to others, such as travelers, astronauts, military planners, and persons in general.

Heretofore, earth representing globes have generally been supported by rotation about a spin axis without means for indicating, at all times, the corresponding position of that part of the earth's surface currently illuminated by the sun.

SUMMARY OF THE INVENTION

Accordingly, a principal object of the present invention is to provide a device for continually displaying on a globe representing a planet, an area corresponding to that of the planet's surface which is currently illuminated by the sun.

Another object is to provide such a device which is contained substantially within a hollow globe representing the planet.

Another object is to provide such a device for continually displaying the current time of day at a specific place and at any other place around the planet.

Another object is to provide such a device for continually displaying the current day, month and season in a specific place.

A further object is to provide such a device which is simple and economical to manufacture and which takes up a minimum amount of space.

According to the present invention, a hollow globe of light transmitting material is provided depicting the planet's surface. A light source is provided within the globe for projecting light rays over one half of the globe. The light source is rotated about the north-south or spin representing axis of the globe at the rate of one revolution per day of the planet. Concurrently, the light source is oscillated about an axis coincident with the center of the globe and at right angles to the north-south axis at the rate of one oscillation per orbit around the sun and through an included angle equal to twice the angle of inclination of the planet's spin axis relative to the plane of its orbit around the sun to thus illuminate the portion of the globe surface corresponding at all times to the portion of the planet's surface illuminated by the sun.

According to another aspect of the invention, readable scale means are rotatably in synchronism with the light source to continually indicate the local sun time at any specific place as well as the day, month and season.

BRIEF DESCRIPTION OF THE DRAWINGS

The manner in which the above and other objects are accomplished will be readily understood on reference to the following specification when read in conjunction with the accompanying drawings wherein.

DESCRIPTION OF THE PREFERRED EMBODIMENT

Figure 1:
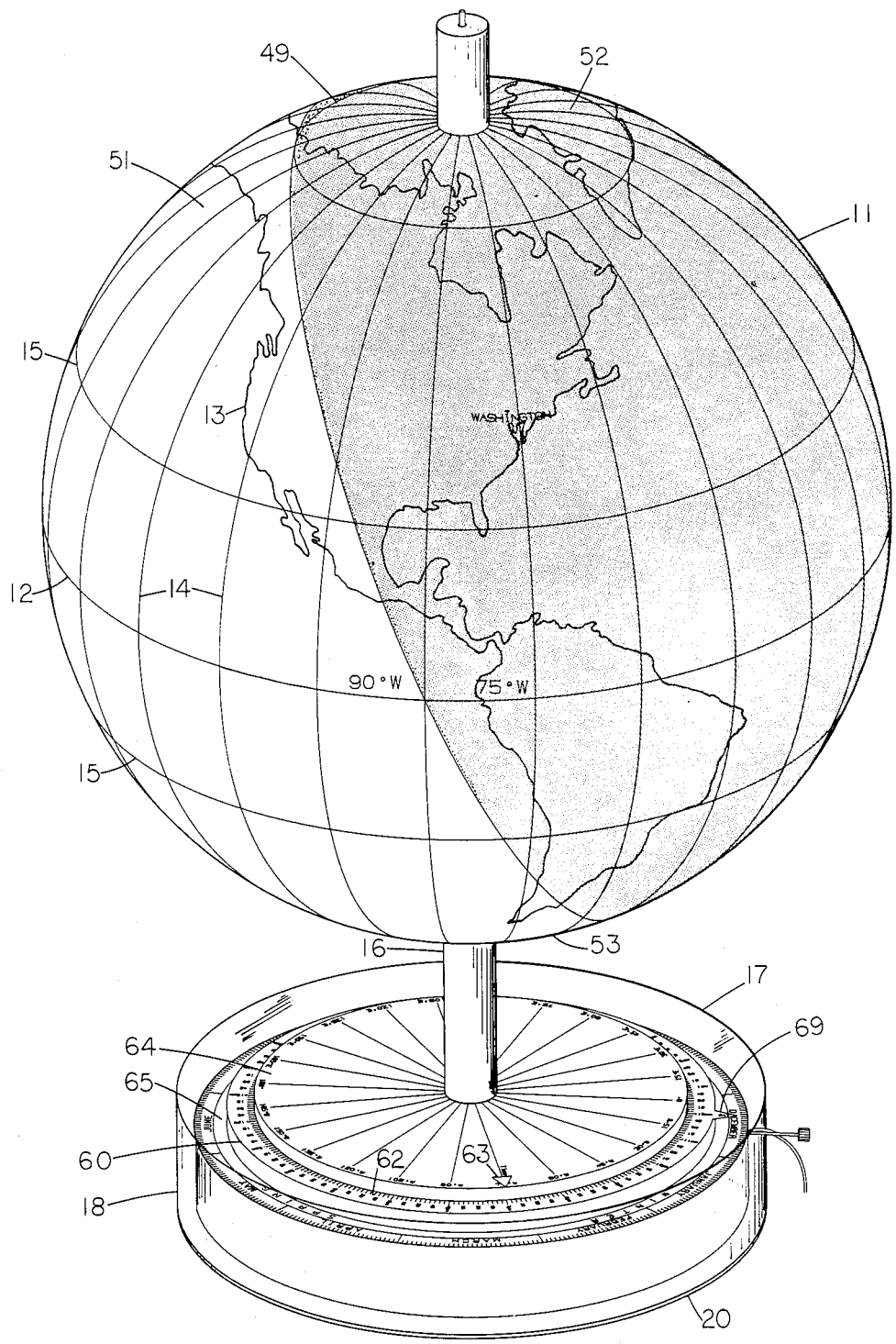
FIG. 1 is a perspective view of the device.

While this invention is susceptible to embodiment in many different forms, there are shown in the drawings and will be described certain embodiments, with the understanding that the present disclosure is to be considered as an exemplification of the principles of the invention and is not intended to limit the invention to the embodiments illustrated. The scope of the invention will be pointed out in the appended claims.

Referring now to FIGS. 1 to 4, the device comprises a hollow sphere 11 of light transmitting material, such as plastic, preferably formed in two halves suitably joined together, as by adhesive, along their adjoining diametrical edges as at 12. The edges 12 thus form the equatorial plane of the sphere.

A map of the earth, partly illustrated at 13 (FIG. 1), is preferably imprinted on the outer surface of the sphere 11 to form a world globe, and meridian lines 14 as well as parallels of latitude 15 are also imprinted thereon.

The globe is secured to the upper end of a tubular support 16 supported on the transparent cover 17 of a cylindrical base generally indicated at 18. The cover, in turn, is secured to a relatively heavy floor member 20 to prevent accidental tipping of the globe.

The support 16 extends coaxially of the north-south indicating axis 21 of the globe and of the axis of the base 18.

An electrically driven clock motor 22 is mounted in the base 18 on a bracket 23 secured to the side of the base cover 17. The motor has two output drive trains, one terminating in a gear 24 continuously driven at a speed of one revolution per 24 hours and the other train terminating in a gear 25 continuously driven at a speed of 364/365 revolution per 24 hours. Alternatively, the latter may be driven at a speed of one and 1/365 revolutions per 24hours.

Gear 24 is attached to a tubular shaft 26 extending coaxially of the globe axis 21 and rotatably supported by bearings 27 and 28 in the support 16. The upper end of the shaft 26 has a yoke formation 30 formed thereon, as shown particularly in FIG. 3, to carry bearings 31 and 32 whose coaxial axes extend a right angles to the globe axis 21 and lie coincident with center 33 of the globe.

The bearings 31 and 32 pivotally support pins 34 secured to brackets 39 carried by a conical light shield 35 movable within the globe. The shield 35, which may be formed of a light reflective material to comprise a light reflector, forms part of a light source including a lamp 36 mounted in a lamp socket 37 carried by the reflector 35 at its apex. A flexible electrical conductor 38 connects the lamp socket 37 to an exterior source of electric current (not shown) through a suitable rotary contact device 40 extending through the globe 11, thus supplying current to the lamp 36 as it is rotated about the globe axis 21.

A second shaft 41 is rotatably mounted within the tubular shaft 26 and is attached to the motor gear 25. Shaft 41 has an arm 42 attached to its upper end, the arm having a vertically extending bearing hole 43 to receive a spherical bearing 44 formed on the lower arm 48 of an L shaped motion translating pin 45. The latter extends along an axis intersecting the center 33 of the globe and has an upper end 46 extending at right angles and fitting in a bearing 47 carried by brackets 39 suitably secured to the rear of reflector 35. The axis of arm 46 also intersects the globe center 33.

Figure 2:
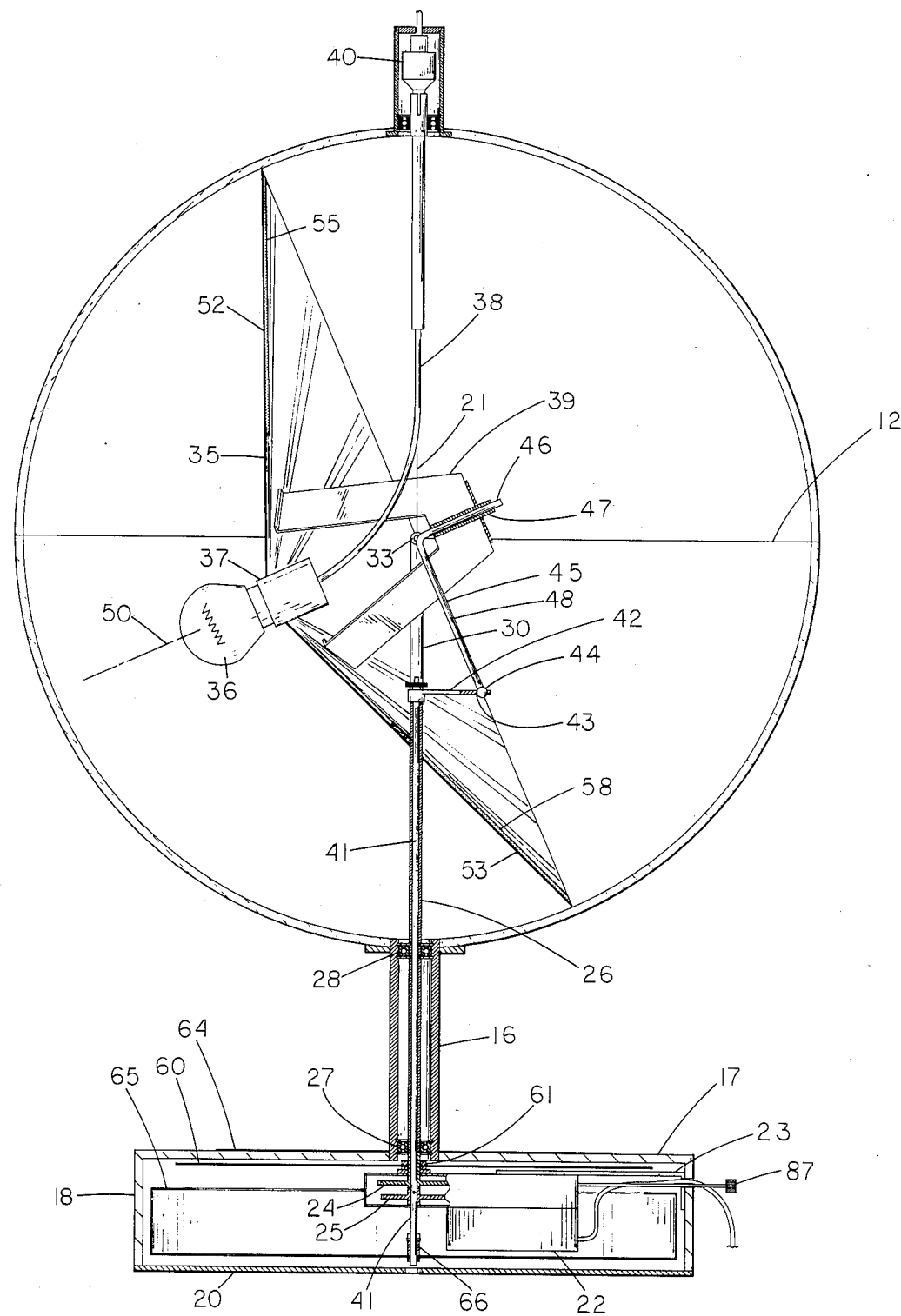
FIG. 2 is a sectional elevational view of the device.
Figure 3:
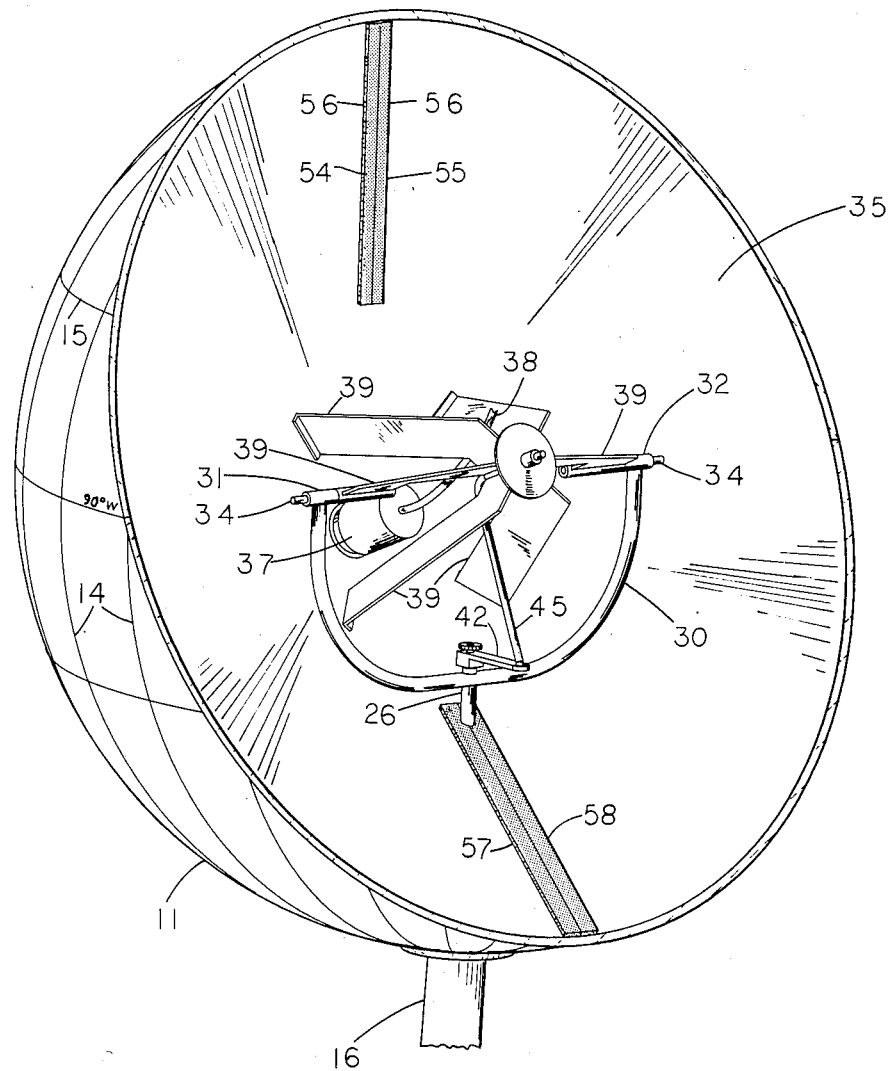
FIG. 3 is a sectional perspective view of upper part of the device.
Figure 4:
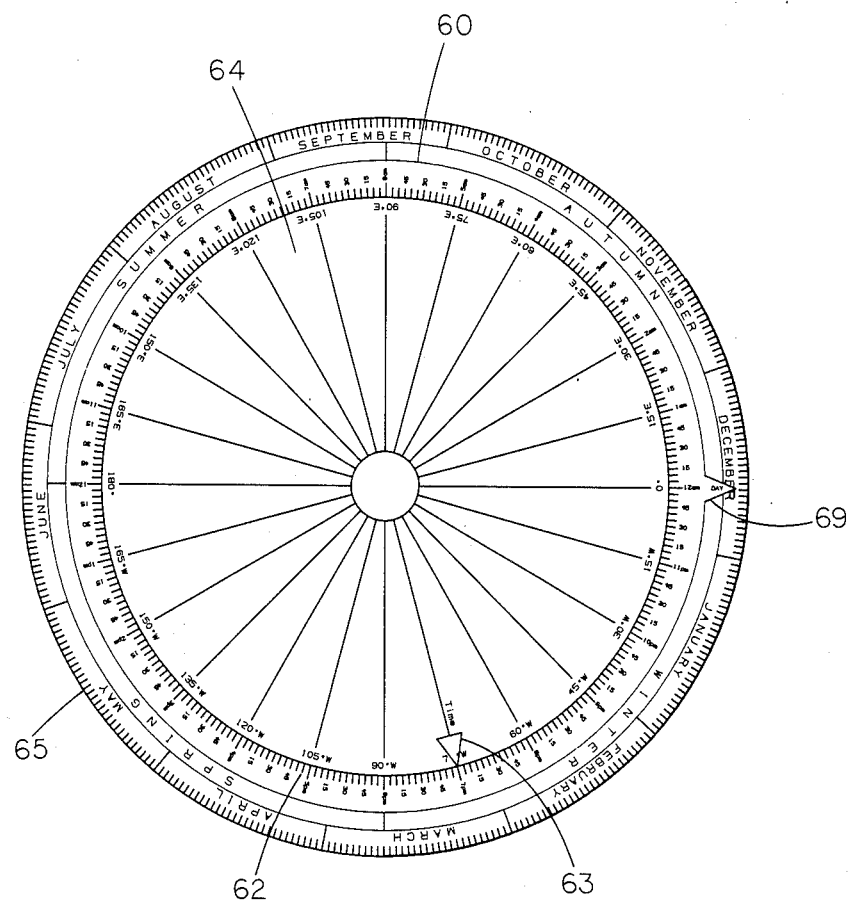
FIG. 4 is a schematic plan view showing the indicia dials for indicating time of day, day, month and season.

The arm 42 is formed of such a length that when the light source, including reflector 35 and lamp 36, is in its position depicted in FIG. 2, representing the winter solstice, i.e. on or about December 21, the axis 50 of the light source is inclined at an angle of substantially 23½ degrees below the equatorial plane represented by the adjoining edges 12 of the globe halves.

Accordingly, the lamp 36 and reflector 35 will illuminate an area depicted at 51 (FIG. 1) representing that area of the earth illuminated by the sun at that time. Thus, as the light source rotates about the axis 21 of the globe at the rate of one revolution per 24 hours, areas of the globe corresponding to those areas of the earth lit by the sun, will be illuminated. Since December 21 represents the beginning of winter in the northern hemisphere of the earth, that area 52 of the globe above the parallel of latitude indicating line 49, representing the north polar region, will be in continuous darkness throughout the winter days and that area 53 representing the south polar regions will be continually illuminated throughout such winter days.

It will be noted from the description thus far that as the light source is rotating at a constant speed of one revolution per 24 hours or substantially 365 revolutions per year about the polar axis 21, the arm 42 is rotating in the same direction at a slightly less speed of 364/365 revolutions per 24 hours or substantially 364 revolutions per year. Thus, the axis of the lower arm 48 of the L-pin 45 travels through a conical plane having its apex at the globe center 33 while the upper arm 46 thereof is constrained to move only in a vertical plane due to the pivoted constraint by the bearings 31, 32, the vertical plane, however, continually rotating about the globe axis 21 at the rate of one revolution per 24 hours. Thus, during each 24 hour period, the reflector 35 and lamp 36 will be slightly rocked clockwise about the axes of bearings 31, 32 until the vernal equinox, i.e. March 21, is reached at which time the axis 50 of the reflector 35 and lamp 36 will extend coincident with the equatorial plane, i.e. 12 of the globe. Thereafter, as the shafts 26 and 41 continue their relative rotations, the reflector 35 and lamp 36 will be further rocked clockwise so that their axis 50 as viewed in FIG. 2 will be inclined above the equatorial plane 12, and when the summer solstice, i.e. June 21, is reached, the axis 50 will be inclined at an angle of substantially 23½ degrees above the equatorial plane 12. At this time, the arm 42 will have rotated 180 degrees relative to the shaft 26 and yoke 30. Now, as the shafts 26 and 41 continue their rotations, the L-pin 45 will be constrained to reverse the rocking of the reflector 35 and lamp 36 about the axis of bearings 31, 32 until they complete their oscillation on the next December 21 at which time they will again assume their positions shown in FIG. 2.

To permit the above noted oscillation of the reflector 35 about the axes of bearings 31 and 32, radially extending slots 52 and 53 are formed in the reflector to receive the electrical conductor 38 and shaft 26, respectively. Slot 52 is normally covered by a pair of abutting fabric strips 54 and 55 (FIGS. 2 and 3) to block light from the lamp 36 from illuminating the area of the globe behind the reflector 35. Such strips 54 and 55 are secured along their opposite edges 56 by a suitable adhesive. However, as the reflector 35 oscillates about the axis of bearings 31 and 32, the upper portion of the conductor passes along the slot 52 and causes the strips to part. Abutting fabric strips 57 and 58 also normally cover the slot 53 but allow the shaft 26 to pass along the slot as the reflector 35 is tilted.

Means are provided to display the current solar time at both the observer's longitude and position and at any other position around the earth. For this purpose an annular time dial 60 is fastened at 61 to the drive shaft 26 within the base cover 17. Such dial has regularly spaced indicia 62 inscribed thereabout indicating hours and minutes. The dial 60, which accordingly rotates one revolution each 24 hour period, moves past an index marker 63 affixed to the upper surface of the base cover 17 to indicate the solor time at the observer's position. An annular scale 64 graduated into 360 degrees, with markings every 15 degrees, is also affixed to the upper surface of the base cover 17 to represent longitudinal positions around the earth. Thus, by referencing a desired longitudinal position in degrees on scale 64 relative to the time dial 60, the current time at such longitudinal position may be directly determined.

The index marker 63 many be affixed by pressure sensitive adhesive or the like so that it may be readily moved to different positions about the base cover 17 corresponding to the observer's longitudinal position on the earth.

A third annular calendar dial 65 having markings divided into days, months and yearly seasons is located within the base cover 17 and is attached at 66 to the lower end of the drive shaft 41. An index marker 69 on the time dial 60 cooperates with the dial 65 to indicate at any time the day, month and season of the year.

Suitable means (not shown) may be provided under control of a knob 87 to selectively manually rotate the drive gears 24 and 25 to initially adjust the device to proper time and solar illumination representing conditions. Means (not shown) may also be provided for temporarily operating the motor 22 at an abnormal speed to likewise adjust the device or demonstrate the concept of time whenever desired.

The interior of the globe is preferably sprayed or otherwise coated with a translucent light or heat responsive paint effective to change color as the lamp 35 and reflector pass therebeneath. One such paint, designated "Liquid Crystal Indicating Paint", is commercially obtainable from the Nu-Metal Paint Co. of Mallory, Ind. This construction is particularly applicable to a situation where it is desirable to suspend the globe 11[1] from a ceiling or the like.

DESCRIPTION OF THE MODIFIED EMBODIMENT

Figure 5:
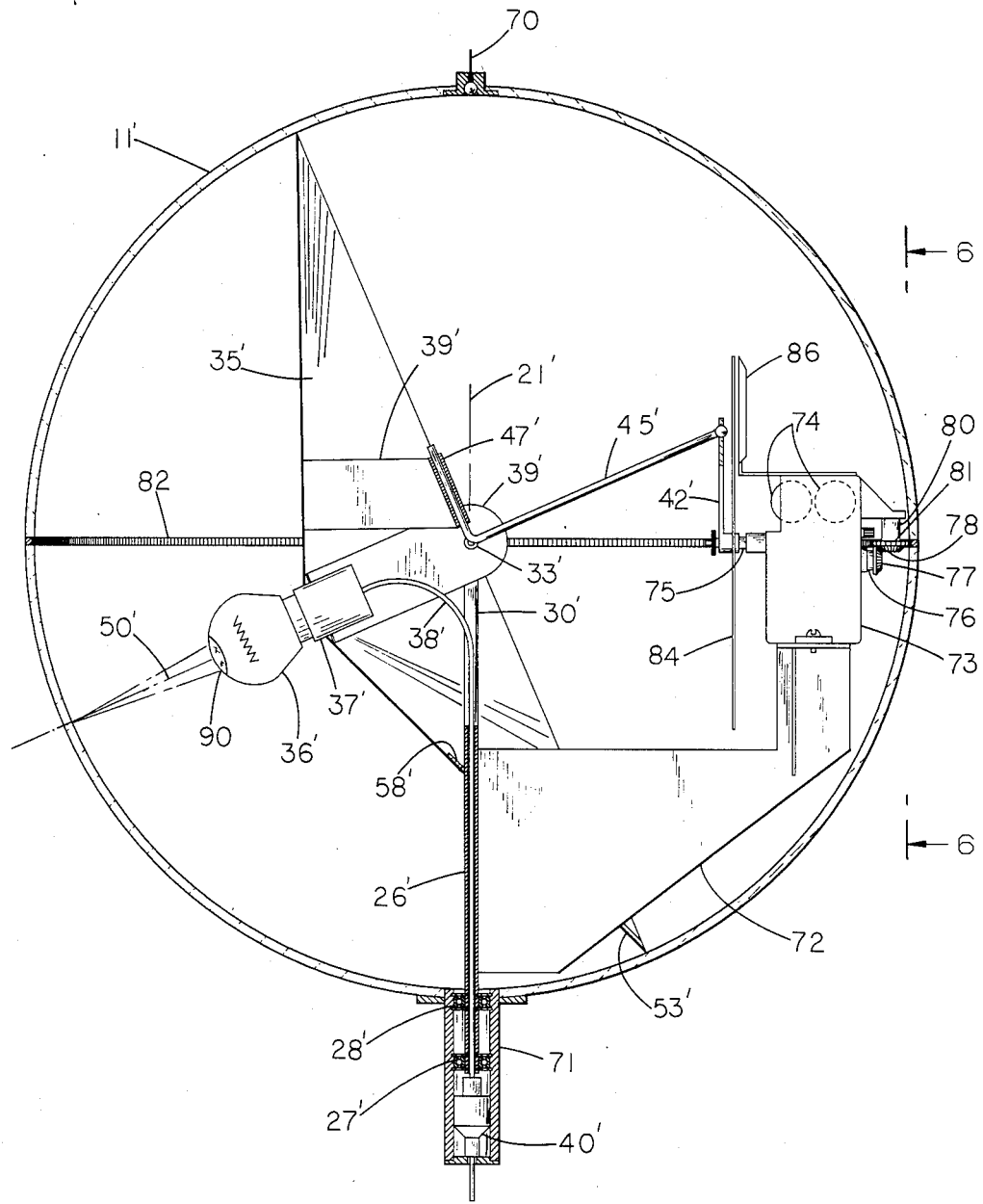
FIG. 5 is a fragmentary sectional view showing a modified form of the invention.
Figure 6:
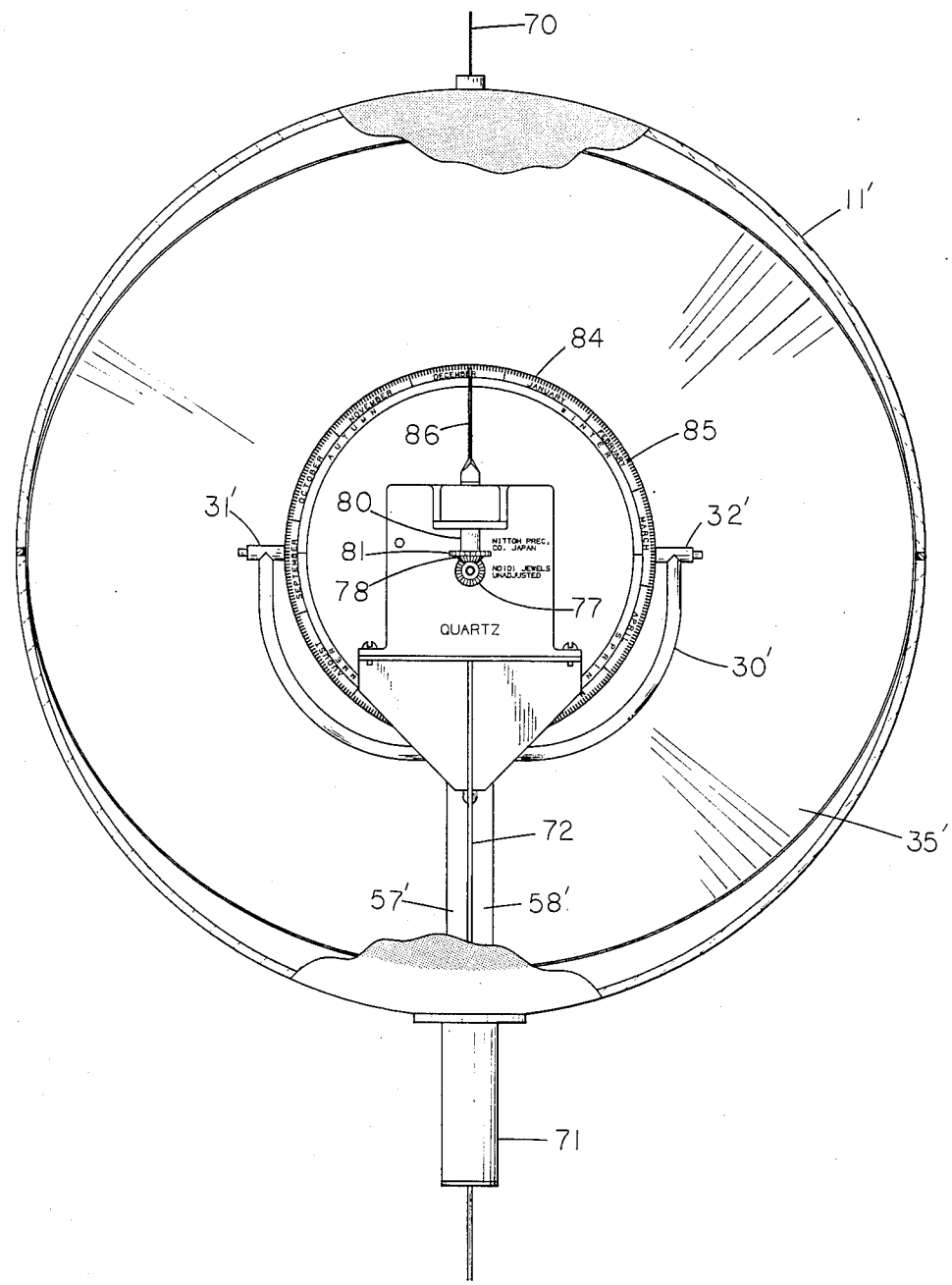
FIG. 6 is a fragmentary sectional view taken substantially along line 6—6 of FIG. 5.

FIGS. 5 and 6 illustrate a modified embodiment of the invention.

In this case, the globe $11^1$ is suspended in a stationary position by a suitable cable 70. The hollow yoked shaft $26^1$ is rotatably mounted in bearings $27^1$ and $28^1$ carried in a tubular support member 71 extending through the lower end of the globe $11^1$ and suitably secured thereto. The flexible current conductor $38^1$ for the lamp $36^1$ passes through the shaft $26^1$ and is connected through rotary contact device $40^1$ to an external current source (not shown).

A bracket 72 is secured to the hollow shaft $26^1$ and carries a clock motor 73 which is somewhat similar to clock motor 22 but is this case it is driven by batteries 74 carried thereby.

The drive arm $42^1$ for driving the L-pin $45^1$ is attached to an output motor shaft 75 which is continually driven at the rate of 1/365 revolution per 24 hours. A second output motor shaft 76 carries a bevel gear 77 meshing with a bevel pinion 78 rotatably mounted on a bearing pin 80 carried by the motor 73. The pinion 78 has a spur gear 81 formed thereon which meshes with a ring gear 82 secured to the interior surface of the globe $11^1$ and extending around its equator. As the gear 81 rotates about the stationary ring gear 82, it drives the reflector $35^1$ and lamp $36^1$, through bracket 72 and shaft $26^1$, about the globe axis $21^1$. The shaft 76 is driven at a rate such as to rotate the reflector $35^1$ and lamp $36^1$ one revolution per 24 hours to thus effect the same transitory result as is obtained by the mechanism of FIGS. 1 to 4.

A circular calendar dial 84 having a scale 85 divided into days and months is secured to the motor shaft 75 and moves past an index marker 86 carried by the motor 73 to display the current day and month.

It will be noted that the lamp $36^1$ is modified to contain a small condensing lens 90 effective to focus a concentrated beam of light onto the surface of the globe $11^1$ along the axis $50^1$ of the lamp. Accordingly, a bright spot of light will be visible on the globe which will move thereover to represent a point at which a light ray passing from the center of the sun toward the earth's center currently intersects the earth's surface.

Since the light spot traverses the globe in timed relation to the rotation of the earth, it will be noted that the time of day can be determined and thus this feature comprises a time clock. That is, by interpreting the 360 degrees of longitude as corresponding hours of the day, the solar time can be readily determined by the position of the light spot relative to the various meridians of longitude, i.e., 14 (FIG. 1.).

If desired, a time scale divided into minutes and 24 hours could be inscribed around the equator of the globe to facilitate reading of time.

Also, a calendar scale divided vertically into days, months and seasons could be inscribed around the globe on opposite sides of the equator 12 to facilitate reading of these periods on reference to the light spot.

I claim:

1. A device for displaying a representation of sun lit areas of a planet comprising
    a globe of light transmitting material,
    said globe having a surface representing the surface of the planet,
    means within said globe for illuminating at least substantially one half of said surface,
    a first drive device for causing relative rotation between said globe and said illuminating means about the polar axis of the globe at the rate of one revolution per day of the planet,
    first pivot means on said first drive device supporting said illuminating means for an oscillating movement about a second axis at right angles to said polar axis,
    said second axis intersecting said polar axis,
    a motion translating member,
    second pivot means pivotally connecting said member to said illuminating means for movement about a third axis coincident with the intersection of said polar axis and said second axis,
    a second drive device movable about an axis coincident with said intersection,
    third pivot means pivotally connecting said member to said second drive device eccentrically of the axis of rotation of said second drive device, and,
    means for rotating said second drive device at a rate such that said illuminating means moves through a complete oscillation about said second axis during each orbit of the planet about the sun.

2. A device as defined in claim 1 wherein said illuminating means comprises means for illuminating a hemispherical area of said globe,
    the center of said hemispherical area being located coincident with said third axis.

3. A device as defined in claim 1 wherein said illuminating means comprises means for illuminating a hemispherical area of said globe,
    the center of said hemispherical area being located coincident with said third axis, and
    a line passing through said intersection and said third pivot means extending at right angles to said third axis.

4. A device as defined in claim 1 wherein said illuminating means comprising a light shield extending across said globe,
    a light source on one side of said light shield, and
    means on the opposite side of said light shield forming a bearing having a bearing axis extending coincident with said intersection of said polar axis and said second axis,
    said bearing constraining said motion translating member to pivot about said bearing axis.

5. A device as defined in claim 4 wherein said motion translating member comprises an L-shaped member having a pair of arms extending at right angles to each other,
    one of said arms being journalled in said bearing and the other of said arms being connected to said third pivot means.

6. A device as defined in claim 1 wherein said third pivot means comprise a universal joint.

7. A device as defined in claim 1 comprising motor means for driving said first and second drive devices.

8. A device as defined in claim 1 wherein said first drive device comprises a first shaft rotatable about said polar axis,
    said globe supporting means comprising a base,
    an hour time scale connected to said first shaft, and
    an index marker on said base cooperable with said time scale to indicate time.

9. A device as defined in claim 8 comprising means whereby said index marker may be located in different positions around said hour time scale whereby to indicate time at different longitudinal positions on the globe.

10. A device as defined in claim 9 wherein said second drive device comprises a second shaft rotatable about said polar axis, a calendar scale connected to said second shaft, and an index marker on said time scale and cooperable with said calendar scale whereby to indicate months.

11. A device for displaying a representation of sun illuminated areas of a planet, comprising a hollow globe of light transmitting material, said globe having a surface representing the surface of said planet, said globe having a first axis representing the polar axis of the planet, means within the globe for illuminating one half of said globe to represent sun-illuminated areas of the planet when viewed from the exterior of the globe, means for causing relative rotation between said representing means and said globe about said axis at the rate of one revolution per day of the planet, means for concurrently causing relative oscillation between said representing means and said globe about an axis at right angles to said polar axis through an angle equal to twice the angle of inclination between said polar axis and a line perpendicular to the plane of the orbit of said planet about the sun and at the rate of one oscillation per orbit of said planet about the sun, said rotating means comprising a first rotatable drive member, said oscillating means comprising a second rotatable drive member, means for rotating said drive members at different rates of rotation, and means controlled jointly by said first and second drive members for causing said oscillating means to oscillate through said angle.

* * * * *